(12) United States Patent
Hellwig et al.

(10) Patent No.: US 9,384,773 B2
(45) Date of Patent: Jul. 5, 2016

(54) ANNEALING TREATMENT FOR ION-IMPLANTED PATTERNED MEDIA

(71) Applicant: HGST Netherlands B.V., Amsterdam (NL)

(72) Inventors: Olav Hellwig, San Jose, CA (US); Kurt A. Rubin, San Jose, CA (US); Qing Zhu, San Jose, CA (US)

(73) Assignee: HGST NETHERLANDS, B.V., Amsterdam (NL)

( * ) Notice: Subject to any disclaimer, the term of this patent is extended or adjusted under 35 U.S.C. 154(b) by 236 days.

(21) Appl. No.: 13/832,704

(22) Filed: Mar. 15, 2013

(65) Prior Publication Data

US 2014/0272469 A1    Sep. 18, 2014

(51) Int. Cl.
*G11B 5/74* (2006.01)
*G11B 5/855* (2006.01)

(52) U.S. Cl.
CPC ............. *G11B 5/746* (2013.01); *G11B 5/855* (2013.01)

(58) Field of Classification Search
USPC ......... 427/128, 129, 130, 131, 132, 127, 526, 427/468, 504, 510, 259, 272, 282
See application file for complete search history.

(56) References Cited

U.S. PATENT DOCUMENTS

| | | | |
|---|---|---|---|
| 4,476,152 A * | 10/1984 | Imura et al. | 427/526 |
| 5,192,618 A | 3/1993 | Frankel et al. | |
| 6,603,637 B1 | 8/2003 | Segar et al. | |
| 7,927,725 B2 | 4/2011 | Ishio et al. | |
| 2003/0113524 A1 | 6/2003 | Klemmer et al. | |
| 2009/0310254 A1 * | 12/2009 | Oikawa | B82Y 10/00 360/110 |
| 2010/0188773 A1 | 7/2010 | Zavaliche et al. | |
| 2013/0270221 A1 * | 10/2013 | Grobis | G11B 5/855 216/22 |

FOREIGN PATENT DOCUMENTS

| | | |
|---|---|---|
| CN | 101202145 B | 4/2010 |
| JP | 405275235 | * 10/1993 |
| WO | 2010048030 A2 | 4/2010 |
| WO | WO 2010/048030 | * 4/2010 |

OTHER PUBLICATIONS

Sun et al., Large Area Patterning of Single Magnetic Domains with Assistance of Ion Irradiation in Ion Milling, American Vacuum Society, J. Vac. Sci. Technol. B. 30 (3), May/Jun. 2012.

* cited by examiner

*Primary Examiner* — Michael Cleveland
*Assistant Examiner* — Tabassom Tadayyon Eslami
(74) *Attorney, Agent, or Firm* — Kunzler Law Group, PC

(57) ABSTRACT

The present disclosure relates to a method for fabricating an ion-implanted bit-patterned medium. The method includes providing a medium, the medium having a magnetic layer and a substrate and the magnetic layer includes migrating components. The method further includes forming a patterned mask layer on the surface of the magnetic layer and then ion-implanting the medium through the patterned mask layer, wherein the exposed portions of the magnetic layer comprise trench regions, the covered portions of the magnetic layer comprise island regions, and the transition areas between the trench regions and the island regions comprise boundary regions, wherein the island regions have more favorable magnetic properties than the trench regions. The method also includes annealing the medium, wherein the migrating components diffuse from inside the island regions towards the trench regions.

15 Claims, 11 Drawing Sheets

ANNEALING TREATMENT FOR ION-IMPLANTED PATTERNED MEDIA

FIELD

This disclosure relates to heat treatments for magnetic recording media and more particularly relates to annealing treatments for bit-patterned media that are patterned using ion implantation techniques.

BACKGROUND

For many years conventional magnetic storage devices have been used to store data and information. Magnetic storage devices generally include a magnetic medium with units (e.g., bits) of magnetic material that can be polarized to distinct magnetic states. The direction of the magnetization points in different directions, which can be referred to as a positive state and a negative state, respectively. Each bit can store information (generally binary information in the form of either a 1 or a 0) according to the magnetic polarization state of the bit. Accordingly, magnetic storage devices generally include a "read" element that passes over the magnetic material and perceives the magnetic polarization state of each bit and a "write" element that passes over the magnetic material and changes the magnetic polarization state of each bit, thereby recording individual units of information. Therefore, the amount of information that can be stored on a magnetic storage medium is proportional to the number of magnetic bits on the magnetic storage medium.

There are various types of magnetic storage media and each type involves different fabrication techniques. For example, conventional granular magnetic recording media are disks that have multiple grains in each magnetic bit. In granular magnetic media, all of the domains are co-planar and the surface of the disk is relatively continuous. In order to increase the amount of information that can be stored on a granular magnetic disk, the number of grains per magnetic bit can be decreased while keeping the grain size approximately the same. However, with fewer grains in each bit, there is decreased signal-to-noise ratio (e.g., less signal and more noise). In order to maintain a better signal to noise ratio, methods have been developed that decrease both the size of the magnetic bit and the size of the individual grains making up each magnetic bit, thus keeping the same number of grains in each magnetic bit. However, when the grains become too small, thermal fluctuations can cause the grains to spontaneously reverse polarity, thus resulting in unstable storage and a loss of information.

Bit-patterned media (BPM) is another example of magnetic storage media. In bit-patterned media, each bit is a single magnetic domain rather than a collection of contiguous magnetic grains. The BPM bits can be topographically patterned using lithographic and etching techniques to form magnetically isolated bit islands surrounded by trenches. In some instances, the trenches are formed by etching away a magnetic material. In yet other instances, the physical patterns are etched into a non-magnetic substrate and then a magnetic material is coated over the patterned substrate. Because of the physical separation between the elevated bit islands and the trenches, the width of each distinct bit island can be decreased in order to increase the areal bit density of the device, while still maintaining a high signal-to-noise ratio and high thermal stability.

Another type of BPM is ion-implanted BPM. With ion-implanted BPM, instead of actually etching the surface of the magnetic layer to form trenches and elevated islands, the trench regions are instead exposed to ion-bombardment, which changes the morphology of the magnetic layer without etching it away. In other words, the ions impacting the trench regions damage the crystalline structure, the chemical order, and/or the chemical, electronic, or band-structure properties of the magnetic layer in order to at least reduce the ferromagnetic properties in the trench regions, thus yielding a similar magnetic contrast between the island regions and the trench regions that exists in etched BPM.

Although ion-implantation processes provide distinct benefits, such processes can degrade the magnetic properties in the island regions as the impacting ions damage the side walls of the island regions. For example, the concentration of implanted ions is distributed and changes across a small yet finite spatial dimension in the region near the edge of the implantation (i.e., the boundary regions between the island regions and the trench regions). This is referred to as straggle. The amount of damage or change to the chemical order and the composition itself varies across this spatial dimension. In other words, conventional ion-implantation processes generate magnetic media that, because of the concentration gradient of the implanted ions and the degraded magnetic properties at the peripheral boundaries of the island regions, are susceptible to spontaneous magnetic polarity reversal, thermal instabilities, and/or reduced magnetic volume.

SUMMARY

From the foregoing discussion, it should be apparent that a need exists for a fabrication method that limits the magnetic degradation of the islands in ion-implanted BPM. Beneficially, such a method would not only limit the magnetic degradation but would in fact increase the magnetic stability of the islands in ion-implanted BPM.

The subject matter of the present application has been developed in response to the present state of the art, and in particular, in response to the problems and needs in the art that have not yet been fully solved by currently available BPM fabrication methods. Accordingly, the present disclosure has been developed to provide a method for fabricating ion-implanted BPM that overcomes many or all of the above-discussed shortcomings in the art.

The present disclosure relates to a method for fabricating an ion-implanted bit-patterned medium. The method includes providing a medium that has a magnetic layer and a substrate. The method further includes forming a patterned mask layer on the surface of the magnetic layer. Next, the method includes ion-implanting the medium through the patterned mask layer, wherein the exposed portions of the magnetic layer comprise trench regions, the covered portions of the magnetic layer comprise island regions, and the transition areas between the trench regions and the island regions comprise boundary regions, wherein the island regions have more favorable magnetic properties than the trench regions. The method also includes annealing the medium.

In one embodiment, the magnetic layer includes migrating components which, upon annealing, diffuse from inside island regions to the boundary and/or trench regions. For example, the magnetic layer may include a cobalt-chromium-platinum alloy and the migrating component may be chromium. In another example, the magnetic layer includes a ferromagnetic alloy and the constituents of the ferromagnetic alloy can be selected from the group consisting of oxides, platinum group metals, and transition metals. In yet another embodiment, the ions implanted in the boundary regions during ion implantation may include migrating components which, upon annealing, diffuse from inside island regions to the boundary and/or trench regions. The ions used for ion-implanting may include boron, carbon, phosphorus, arsenic, antimony, selenium, sulfur, chromium, silicon, germanium, nitrogen, and metalloid type elements.

The annealing step may include heating the medium in a vacuum or in the presence of an inert gas and the heating may be accomplished with a laser or a lamp. The annealing step may include heating the medium to a temperature between about 250° C. and about 800° C. In another embodiment, the annealing step may include heating the medium to a temperature between about 300° C. and about 400° C. The annealing procedure may include heating the medium to a temperature for a period of time between about 1 minute and about 120 minutes, for a period of time between about 5 minutes and 60 minutes, or for a period of time between about 30 minutes and 60 minutes. In the case of laser or heat lamp heating, the heating time may be substantially shorter. For example, the heating time may be between about 1 microsecond and 5 minutes or longer. Also, the annealing step may include multiple heating procedures, such as various heating times, various heating rates, and various heating temperatures.

According to another embodiment, the present disclosure relates to a method for fabricating an ion-implanted bit-patterned medium. The method includes providing a medium, the medium having a magnetic layer and a substrate and the magnetic layer includes migrating components. The method further includes forming a patterned mask layer on the surface of the magnetic layer and then ion-implanting the medium through the patterned mask layer, wherein the exposed portions of the magnetic layer comprise trench regions, the covered portions of the magnetic layer comprise island regions, and the transition areas between the trench regions and the island regions comprise boundary regions, wherein the island regions have more favorable magnetic properties than the trench regions. The method also includes annealing the medium, wherein the migrating components diffuse from inside island regions to the boundary and/or trench regions.

In yet another embodiment, the present disclosure relates to an ion-implanted bit-patterned magnetic medium that includes a substrate, a magnetic alloy layer having migrating components. The magnetic alloy later includes island regions, trench regions, and boundary regions between the island regions and the trench regions, wherein the concentration of the migrating components in the island regions is lower than the concentration of the migrating components in the boundary regions. The medium may include trench regions and island regions that are substantially coplanar.

The medium may have a coercivity that is greater than about 4,000 Oe. According to another embodiment, the coercivity of the medium is greater than about 6,000 Oe. The medium may also have an intrinsic switching field distribution that is less than about 700 Oe. Also, the medium may have a ratio of the intrinsic switching field distribution over the coercivity of the medium that is less than about 0.30. In another embodiment, that ratio may be less than about 0.20. Additionally, the concentration of the migrating components in the trench regions may be lower than the concentration of the migrating components in the boundary regions.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

As discussed briefly above, fabricating ion-implanted BPM involves exposing the "trench" regions to ion-bombardment to change the morphology of the magnetic layer without etching it away. In other words, the ions that are impacting the trench regions are damaging and changing the crystalline structure, the chemical order, and/or the chemical, electronic or band-structure properties of the magnetic layer in order to at least reduce the ferromagnetic properties in the trench regions, thus yielding a similar magnetic contrast between the island regions and the trench regions that exists in etched BPM.

Figure 1A:
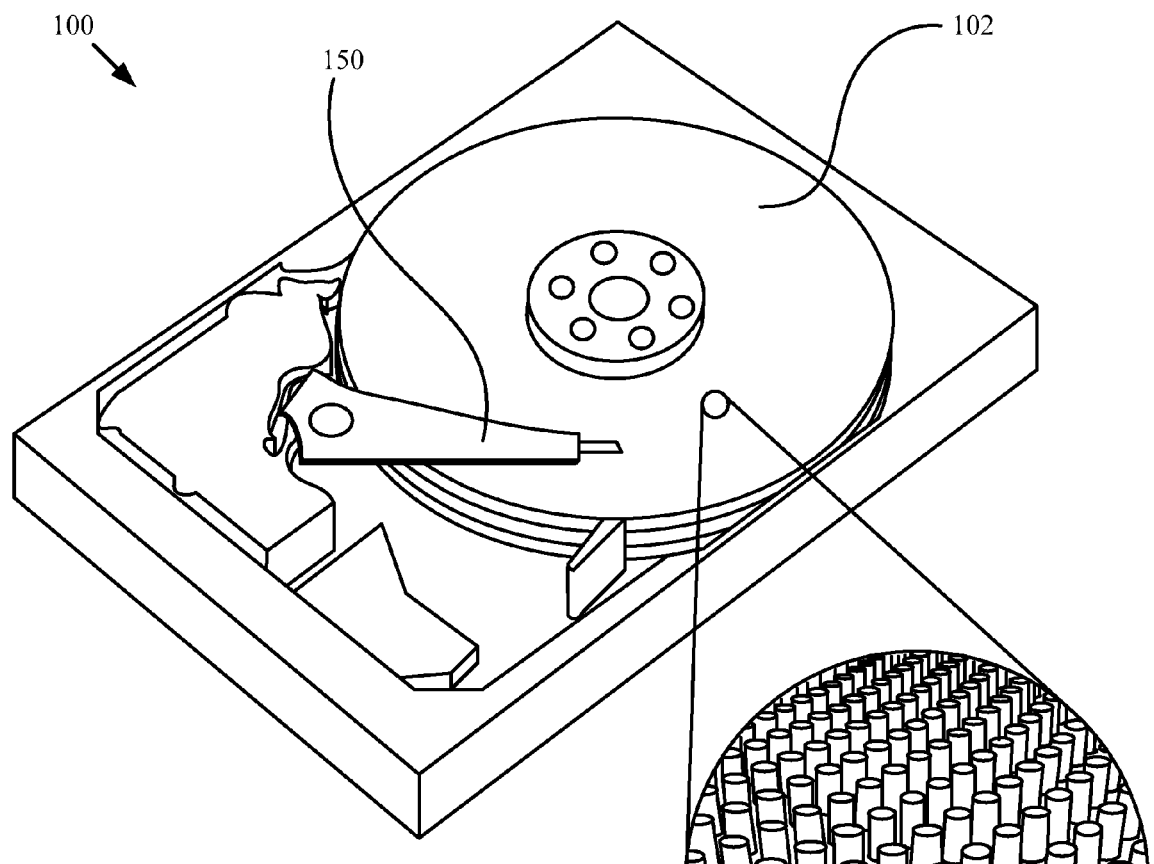
FIG. 1A is a perspective view of one embodiment of a magnetic storage device.
Figure 1B:
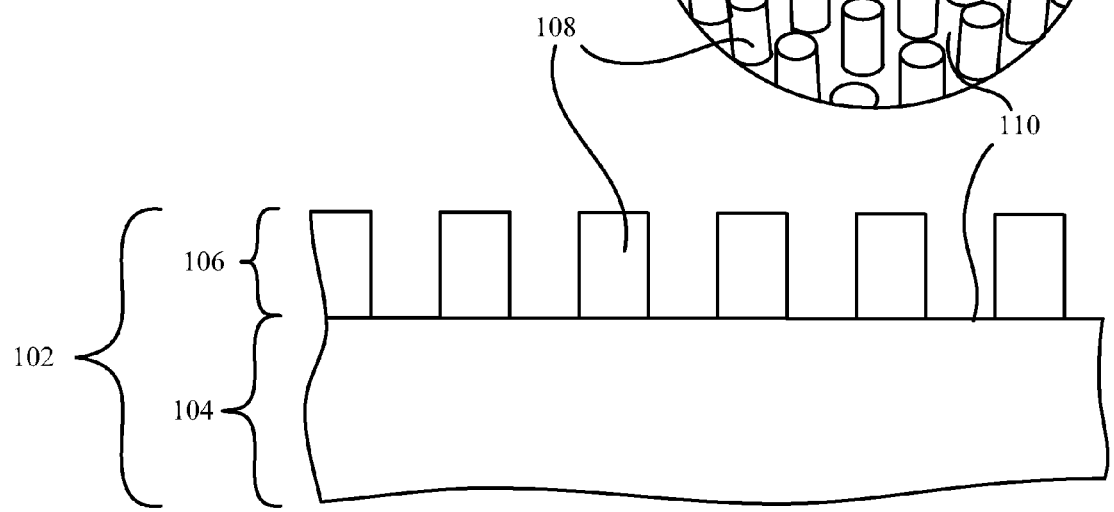
FIG. 1B is a cross-sectional side view of one embodiment of an etched bit-patterned medium from the magnetic storage device of FIG. 1A shown after an etching stage prior to finalization.

FIG. 1A is a perspective view of one embodiment of a magnetic storage device 100. In the depicted embodiment, the medium 102, which includes at least a substrate 104 and a magnetic layer 106, has been etched so as to form physically elevated magnetic islands 108 and contrasting, substantially non-magnetic trench regions 110. FIG. 1B is a cross-sectional side view of one embodiment of an etched bit-patterned medium 102 from the magnetic storage device 100 of FIG. 1A. Although not depicted, most etched BPM includes a non-magnetic filler material that levels the trench regions, thus generating a medium 102 that is substantially continuous and coplanar. A continuous surface enables the read/write head 150 to "fly over" the medium 102 smoothly and consistently, thus enhancing the accuracy and stability of the magnetic storage device 100.

Figures 2A, 2B:
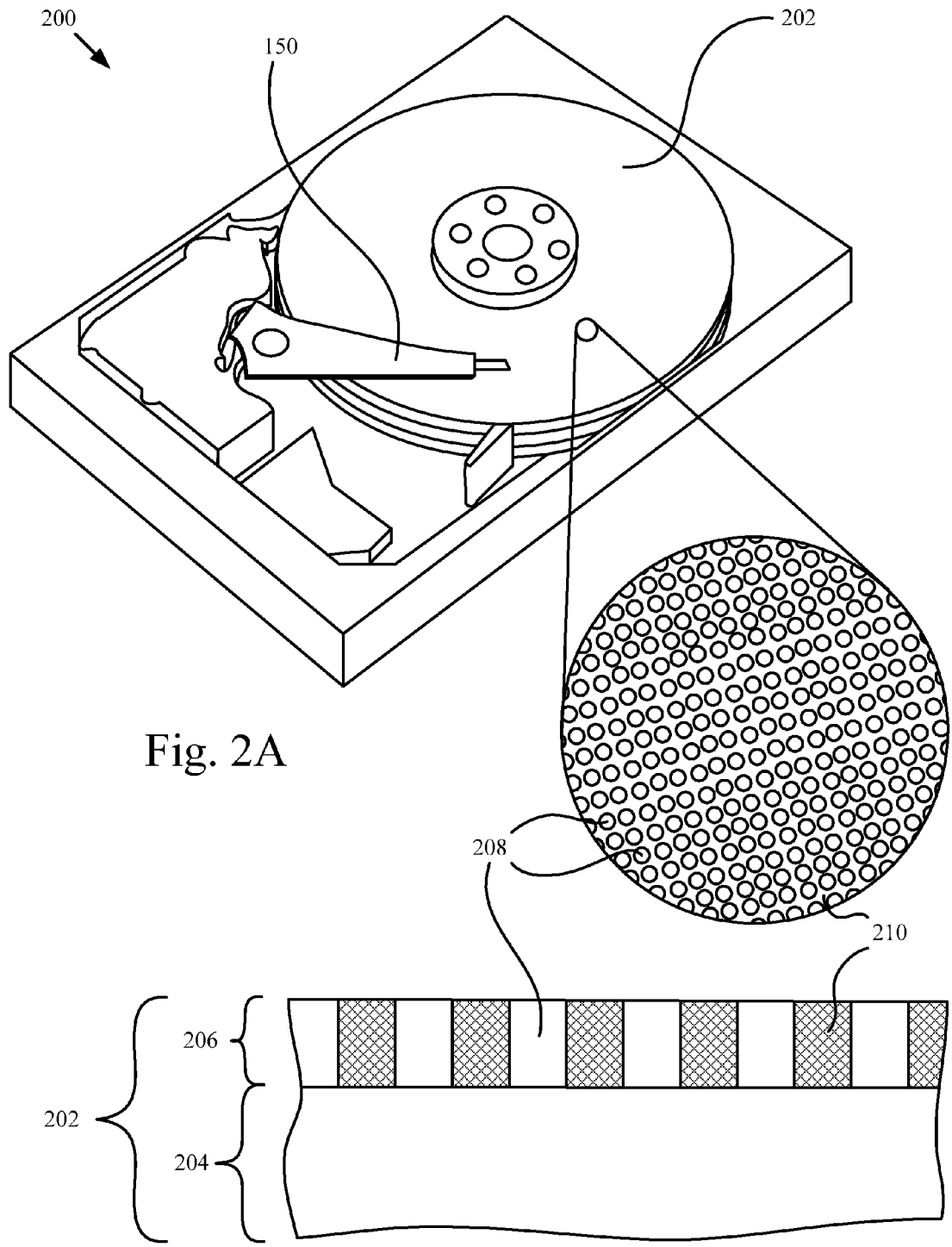
FIG. 2A is a perspective view of another embodiment of a magnetic storage device.
FIG. 2B is a cross-sectional side view of one embodiment of an ion-implanted bit-patterned medium from the magnetic storage device of FIG. 2A.

FIG. 2A is a perspective view of another embodiment of a magnetic storage device 200. In the depicted embodiment, the medium 202, which includes at least a substrate 204 and a magnetic layer 206, has been bombarded with ions so as to render the trench regions 210 substantially non-magnetic. FIG. 2B is a cross-sectional side view of one embodiment of an ion-implanted bit-patterned medium 202 from the magnetic storage device 200 of FIG. 2A. One advantage of ion-implanted BPM is that there is no need for a separate planarization step during fabrication because the magnetic layer is already substantially coplanar. Accordingly, the fabrication process can be an all-vacuum process, thus reducing the cost of fabricating BPM.

However, conventional ion-implantation processes often degrade the magnetic properties in the island regions as the impacting ions damage the side walls or cause a transition of the crystalline structure, chemical order or composition from non-implanted to implanted over the transition region at the boundary of the island regions. For example, the magnetic moment can be relatively high inside the BPM island and relatively low in the trench, but across the transition region the magnetic moment can vary. In other words, ion-implantation processes may result in magnetic media that are susceptible to spontaneous magnetic polarity reversal and thermal instabilities because of the degraded magnetic properties at the peripheral boundaries of the island regions. Therefore, as mentioned above, a method for fabricating ion-implanted BPM is needed that overcomes these discussed shortcomings.

Figure 3:
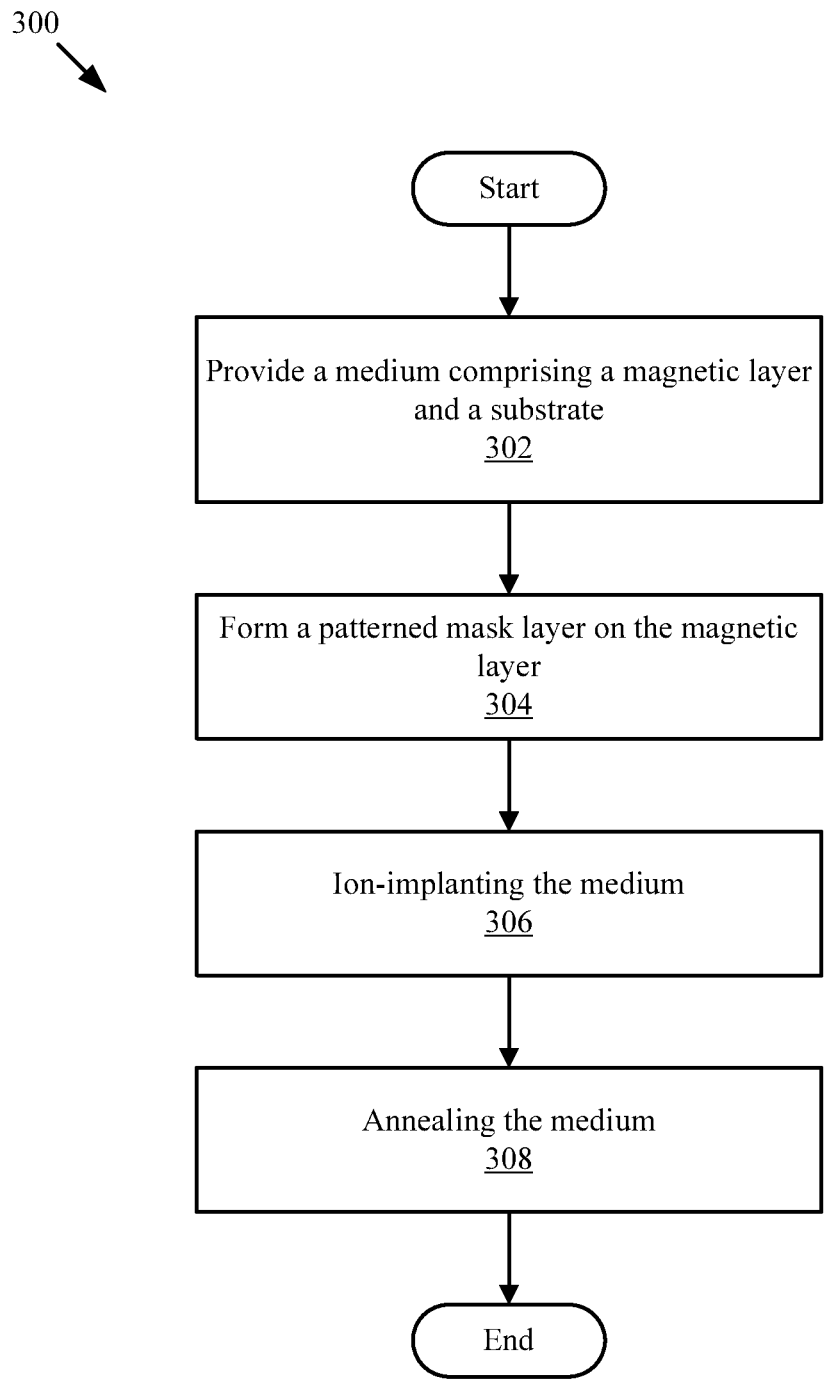
FIG. 3 is schematic flow chart diagram of one embodiment of a method for fabricating an ion-implanted bit-patterned medium.

FIG. 3 is schematic flow chart diagram of one embodiment of a method 300 for fabricating an ion-implanted bit-patterned medium 202 in accordance with the present disclosure. The method 300 includes providing 302 a medium that has a magnetic layer and a substrate, forming 304 a patterned mask layer on the magnetic layer, ion-implanting 306 the magnetic layer, and annealing 308 the medium. This method will be described in greater detail below with references to FIGS. 4A-7C. Specifically, providing 302 a medium that includes a magnetic layer and a substrate will be discussed below with reference to FIGS. 4A-4C, forming 304 a patterned mask layer will be discussed below with reference to FIG. 5A-5C, ion-implantation 306 will be discussed in greater detail below with reference to FIGS. 6A-6C, and annealing 308 the medium will be discussed in greater detail below with reference to FIGS. 7A-7C.

Figure 4A:
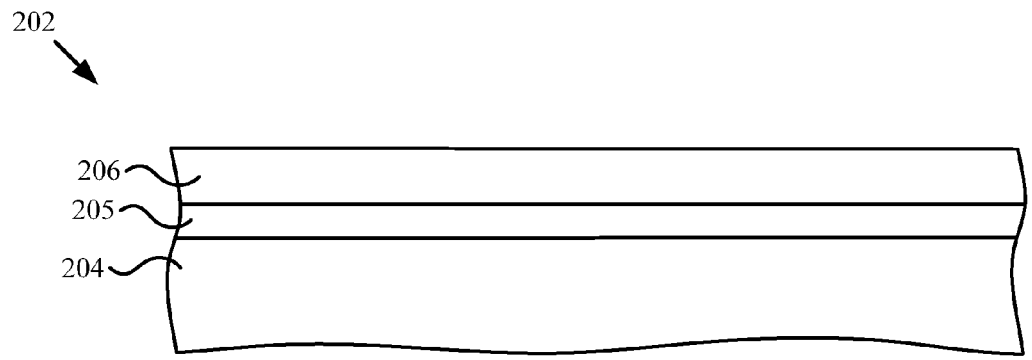
FIG. 4A is a cross-sectional side view of one embodiment of a medium showing a substrate, an underlayer, and a magnetic layer.

FIG. 4A is a cross-sectional side view of one embodiment of a medium 202 showing a substrate 204, an underlayer 205, and a magnetic layer 206. The substrate 204, in one embodiment, is a type of glass or aluminum disk. The substrate 204, in another embodiment, is a type of semiconductor, such as silicon, or the substrate 204 may include quartz, silicon dioxide, $SiO_2$, nickel alloy, silicon alloy, and the like.

The underlayer 205 may have various auxiliary magnetic and non-magnetic layers which lie between the glass disk 204 and the magnetic layer 206. The auxiliary layers 205 can include adhesion layers, a soft magnetic underlayer, seed layers, and grain nucleation layers, among others. In one embodiment, the underlayer 205 includes at least one layer specifically configured to influence the magnetic anisotropy of a subsequently applied magnetic layer(s). For example, a nano-scale nucleation layer may constitute at least a portion of the conditioning layer 105. The nano-scale nucleation layer reduces the intrinsic switching field of certain magnetic layers, such as cobalt-platinum-chromium alloy layers. Examples of nano-scale nucleation layers include MgO, Pt/Cr, CrRu, RuAlm CrMo, Ti, TiN, TiC, SiO2, TaOx, W, Ti, BOx, B, C/BN, SiNx-C, C and other oxides, nitrides and carbides. The underlayer 205 may also include magnetic metals, magnetic alloys (not used for recording information), non-magnetic metal alloys, and the like. For example, alloys of nickel and refractory metals, such as tungsten and tantalum, may constitute a portion of the underlayer 205. Such alloys are well-suited for controlling the crystallographic properties and the magnetic axis orientation of subsequent magnetic recording layers 206.

In one embodiment, the magnetic layer 206 is made from a single metallic component, and in other embodiments the magnetic layer 206 is made from metallic alloys and/or multiple metallic components. Magnetic materials (e.g., ferromagnetic alloys) from which the magnetic layer 206 is made can include iron, cobalt, nickel, and alloys thereof. Ferromagnetic alloys also may include oxides, platinum group metals (e.g. ruthenium, rhodium, palladium, and platinum), transition metals, such as Cr, and the like. The composition of the magnetic layers, whether consisting of a single component or a metallic alloy mixture, may be selected according to the specifics of a given application. Throughout the present disclosure, the term "magnetic layer" 206 may refer to a layer made from any ferromagnetic material or alloy that has the characteristics of a permanent magnet (i.e. a material that, in pertinent part, exhibits a net magnetic moment in the absence of an external magnetic field).

Figure 4B:
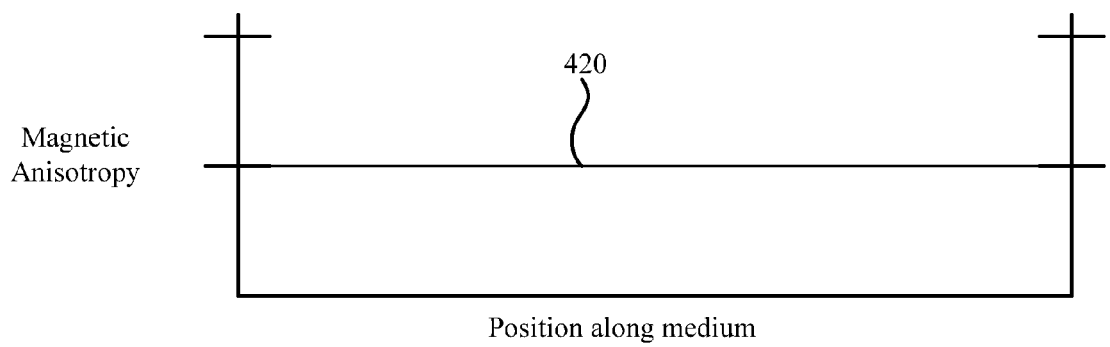
FIG. 4B is a graph showing the approximate relative magnetic anisotropy of the magnetic layer as a function of position along the medium of FIG. 4A, according to one embodiment.

FIG. 4B is a graph showing the approximate relative magnetic anisotropy 420 of the magnetic layer 206 as a function of position along the medium 202 of FIG. 4A. Since magnetism is the result of moving electric charge, the spin of an electron in an atom or a molecule creates a magnetic dipole. A magnetic field is created when the magnetic dipoles in a material result in a net magnitude and direction. Thus, the magnetism of a material is directly related to the magnitude, direction, inter-alignment, and interaction of the magnetic dipoles in the material.

The required field to reverse a magnetic island depends on the intrinsic magnetic anisotropy and moment of the base magnetic material. The anisotropy and moment of a material depends on chemical composition as well as crystallographic order. Larger anisotropies require larger fields to reverse the magnetic orientation. In FIG. 4B, however, the magnetic anisotropy and moment 420 are substantially constant across the provided 302 medium 202. Further processing steps 306, 308 change the morphology and structure of the magnetic layer 206, thus causing the magnetic anisotropy and moment of the medium 202 to change as a function of position along the medium 202 (described below with reference to FIGS. 6B and 7B).

Figure 4C:
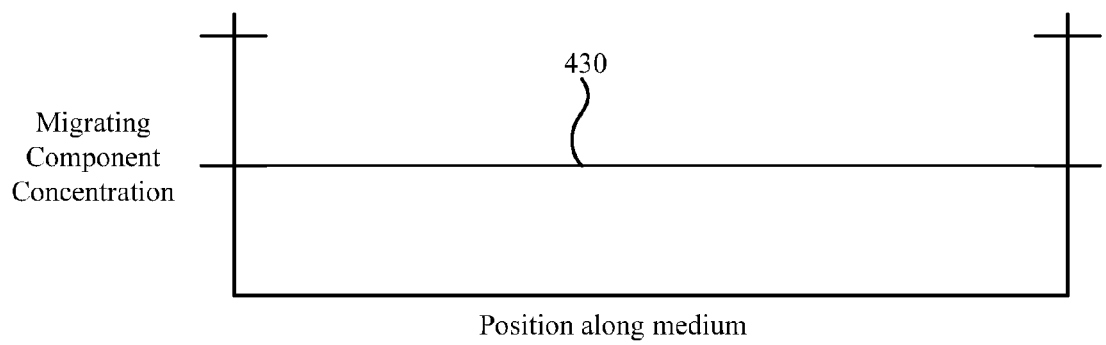
FIG. 4C is a graph showing the approximate relative concentration of a migrating component in the magnetic layer as a function of position along the medium of FIG. 4A, according to one embodiment.

FIG. 4C is a graph showing the approximate relative concentration 430 of a migrating component in the magnetic layer 206 as a function of position along the medium 202 of FIG. 4A, according to one embodiment. The migrating component, in one embodiment, is a constituent of the magnetic layer 206 that is capable and/or susceptible to diffusing from the island regions towards the trench regions. For example, in one embodiment where a cobalt-chromium-platinum magnetic alloy comprises the magnetic layer 206, the chromium atoms may migrate from inside island regions towards the trench regions of the magnetic layer 206 under certain temperature conditions. In FIG. 4C, however, the concentration 430 of the migrating component remains substantially constant across the medium 202. Further details relating to the migrating component are included below with reference to FIG. 7C.

Figure 5A:
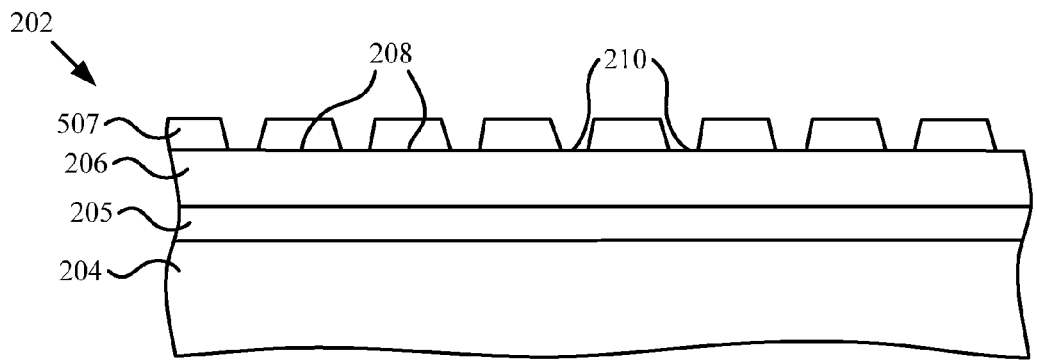
FIG. 5A is a cross-sectional side view of one embodiment of the medium of FIG. 4A but showing a patterned mask formed on the surface of the magnetic layer.

FIG. 5A is a cross-sectional side view of one embodiment of the medium 202 of FIG. 4A but showing a patterned mask 207 formed on the surface of the magnetic layer 206. The patterned mask layer 207 may be any masking material that substantially protects portions of the magnetic layer 206 from subsequent ion-implanting techniques. In one embodiment, the patterned mask layer 207 includes a single layer of masking material. In another embodiment, the patterned mask layer 207 includes multiple layers of masking materials. For example, silicon nitride, silicon dioxide, diamond-like carbon, and chromium are examples of "hard" masking materials that are substantially durable and will not be damaged or destroyed when the patterned medium is treated with reactive gases or chemical solvents during subsequent processing steps (if desired). Additionally, the masking material may be chosen from other suitable materials, such as metals such as Cr, Ta, Al, or Mo or other materials.

It is also contemplated that the patterned mask layer 207 may include "soft" masking materials, such as polymer films and resist materials, etc. Resist materials may include resist compounds such as those that are used in photo-lithography or electron beam lithography. The patterning of the mask layer 207 may be accomplished in a variety of ways. For example, if a resist material is used as the mask layer 207, portions of the resist material may be selectively removed to expose various regions and portions of the underlying magnetic layer 206. ZEP-520 is an example of a suitable resist material that may be employed and patterned as a mask layer 207. Another type of resist materials that may be used is Microposit SJR 5440 photoresist manufactured by Shipley Company of Marlborough, Mass.

The removed portions of the patterned mask layer 207 leave exposed regions of the magnetic layer 206. These exposed regions are referred to as the trench regions 210 and the covered regions are referred to as the island regions 208 throughout this disclosure. Although the terms "island" and "trench" connote physical separation (e.g. elevated islands, grooved trenches), for the purposes of this disclosure, the island regions 208 (e.g., magnetic regions) are the magnetically favorable portions of the magnetic layer 206 on which information will be stored and the trench regions 210 are the magnetically damaged or magnetically unfavorable portions of the magnetic layer 206. The magnetically favorable portions have a comparatively higher magnetic moment, anisotropy, and/or coercivity and the magnetically unfavorable portions have a comparatively lower magnetic moment, anisotropy, and/or coercivity. No physical separation, such as an air gap, is between the two regions 208, 210; instead, the regions 208, 210 are distinguished by their contrasting magnetic properties, crystallinity, composition, and/or chemical properties.

Figure 5B:
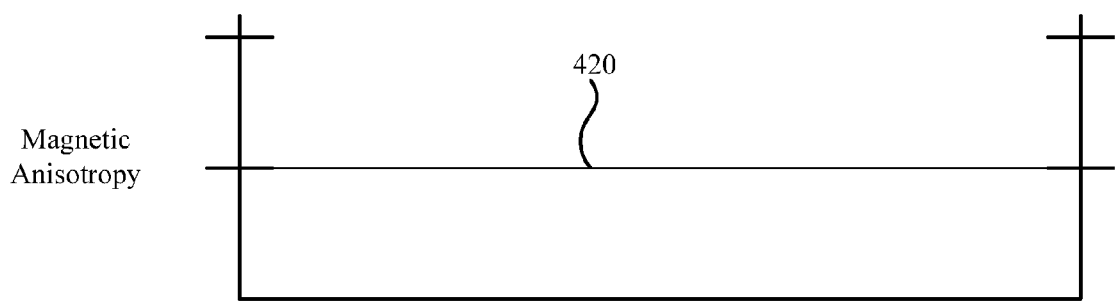
FIG. 5B is a graph showing the approximate relative magnetic anisotropy of the magnetic layer as a function of position along the medium of FIG. 5A.

FIG. 5B is a graph showing the approximate relative magnetic anisotropy of the magnetic layer 206 as a function of position along the medium 202 of FIG. 5A. In FIG. 5B, as in FIG. 4B, the magnetic anisotropy is substantially constant across the provided 302 medium 202 and the application of the patterned mask layer 207 does not substantially affect the magnetic anisotropy of the magnetic layer 206. Further processing steps 306, 308 change the morphology and structure of the magnetic layer 206, thus causing the magnetic anisotropy of the medium 202 to change as a function of position along the medium 202 (described below with reference to FIGS. 6B and 7B).

Figure 5C:
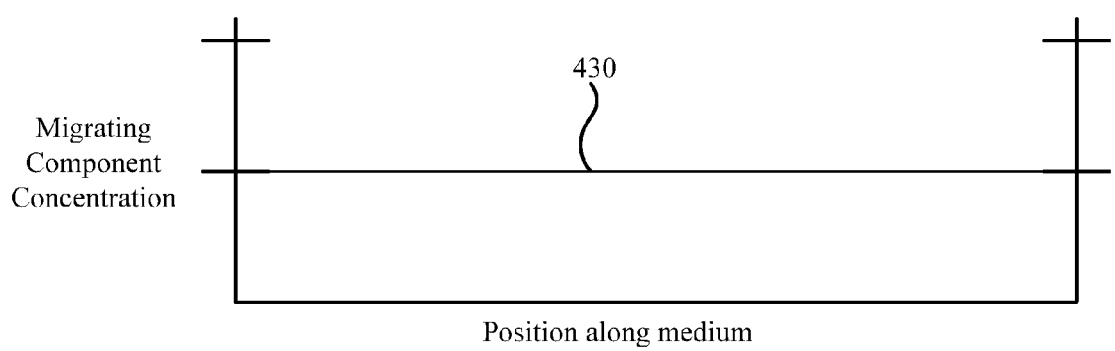
FIG. 5C is a graph showing the approximate relative concentration of a migrating component in the magnetic layer as a function of position along the medium of FIG. 5A, according to one embodiment.

FIG. 5C is a graph showing the approximate relative concentration of chromium in the magnetic layer 206 as a function of position along the medium 202 of FIG. 5A, according to one embodiment. Similar to the graph in FIG. 4C, the concentration 430 of the migrating component remains substantially constant across the medium 202. Further details relating to the migrating component are included below with reference to FIG. 7C.

Figure 6A:
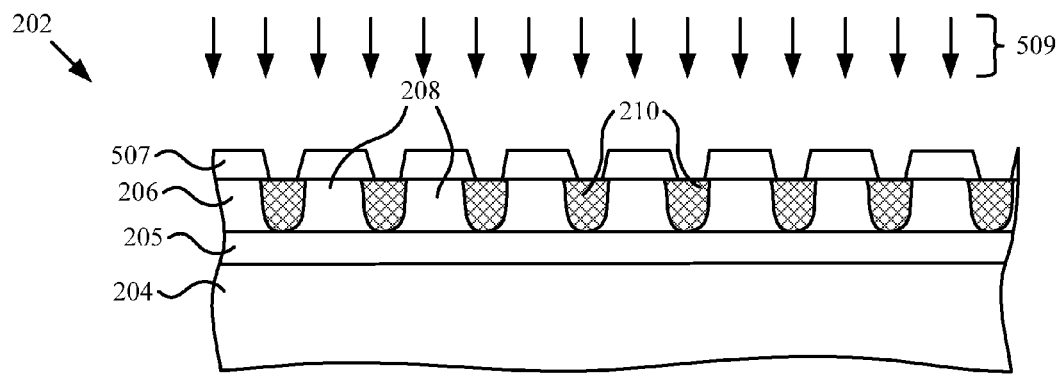
FIG. 6A is a cross-sectional side view of one embodiment of the medium of FIG. 5A after ion-implantation.

FIG. 6A is a cross-sectional side view of one embodiment of the medium 202 of FIG. 5A after ion-implantation. The ion-implantation process is indicated by arrows 509 representing the ion stream directed at the medium 202. As depicted, the magnetic layer 206 includes island regions 208 and trench regions 210 after ion-implantation. As discussed previously, the island regions 208 are not physically elevated from the trench regions 210 as in etched BPM, however, the same terminology of "island" and "trench" is used throughout the present disclosure to refer to adjacent coplanar regions that have contrasting magnetic properties.

Ion-implantation, also referred to as ion-bombardment, involves the acceleration of ions in an electric field towards a surface to be impacted. In one embodiment, ions, such as boron, carbon, phosphorus, arsenic, antimony, selenium, sulfur, chromium, silicon, germanium, nitrogen, hydrogen, and metalloid type elements, are directed at the medium 202. Because of the patterned mask layer 207, the ions only impact the exposed trench regions 210, thereby only degrading the crystalline structure in those areas.

Figure 6B:
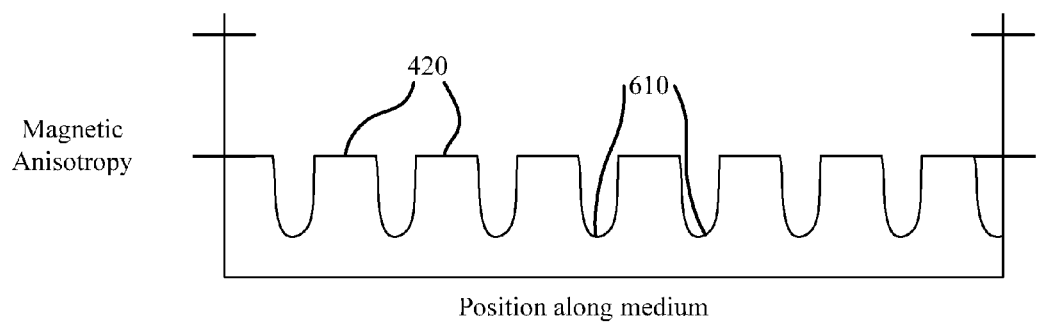
FIG. 6B is a graph showing the approximate relative magnetic anisotropy of the magnetic layer as a function of position along the medium of FIG. 6A.

FIG. 6B is a graph showing the approximate relative magnetic anisotropy of the magnetic layer 206 as a function of position along the medium 202 of FIG. 6A. As shown in the graph, the magnetic anisotropy 420 of the magnetic layer 206 in the island regions 208 remains substantially constant while the anisotropy 610 of the impacted trench regions 210 is comparatively lower.

Depending on the time and intensity of the ion-implantation process, the crystalline structure in the trench regions 210 can be merely damaged or the morphology of the magnetic layer 206 can be changed altogether to form an amorphous solid. After being impacted by the ions, the trench regions 210 generally have lower magnetic moment and magnetic anisotropy and also have less ability to conduct exchange interactions between neighboring non-implanted regions. Therefore, not only does ion-implanted BPM have the benefits of etched BPM with respect to the magnetic contrast between the magnetic properties of the trench regions and the island regions, ion-implanted BPM is substantially coplanar, therefore there is no need for a separate planarization step during fabrication.

The islands "formed" in the magnetic layer 206 can range in width, height, size, and areal density, according to the specifics of a given application. For example, the islands may be substantially cylindrical, as depicted, or the bits may be substantially rectangular, frustoconical, elliptical, or pyramid-like.

However, as described above, the ion-implantation process is not without side-effects. As island sizes decreases in order to meet the ever increasing demand for storage devices with larger capacities, it becomes extremely challenging to maintain the magnetic stability of the islands. With smaller island dimensions, even minor damage to the islands magnetic material may reduce the ability of the islands to maintain a desired magnetic polarity. As discussed above, when a magnetic crystalline structure is damaged, the magnetic moment, the magnetic anisotropy, and the magnetic coercivity of the magnetic layer is decreased, thereby reducing the overall stability of the magnetic recording medium. With ion-implantation, the impacting ions often degrade the side-walls of the islands. These damaged side-walls can lead to spontaneous magnetic polarity switching and to issues with adjacent track erasure. Accordingly, some of the implanted species are distributed in a range of positions across the peripheral edge of the island regions, thus creating a side-wall with a finite width. This finite width to the side-wall means there can be localized variations in the magnetic properties of the side-wall that can degrade the magnetic switching performance. In other words, local variations in the magnetic anisotropy or crystallographic orientation can affect the reversal dynamics and lead to lower required fields to reverse the structure (i.e., the lower anisotropy regions can nucleate the reversal of the whole island). These issues, however, can be mitigated, if not resolved completely, through an annealing procedure as described below with reference to FIGS. 7A-7C.

Figure 6C:
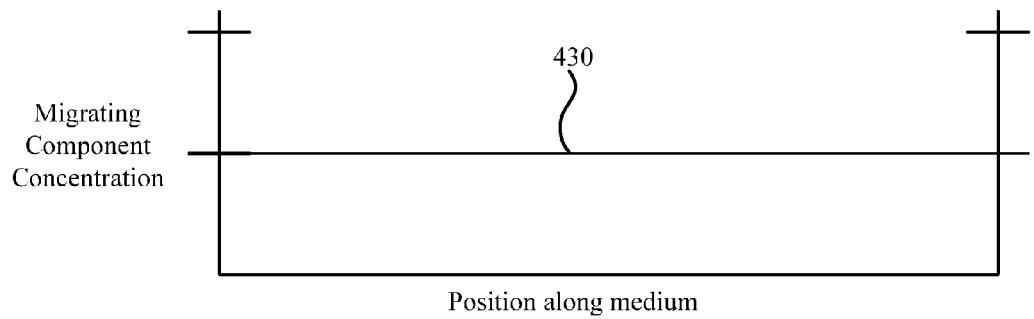
FIG. 6C is a graph showing the approximate relative concentration of a migrating component in the magnetic layer as a function of position along the medium of FIG. 6A, according to one embodiment.

FIG. 6C is a graph showing the approximate relative concentration of chromium in the magnetic layer 206 as a function of position along the medium 202 of FIG. 6A, according to one embodiment. Similar to the graph in FIGS. 4C and 5C, the concentration 430 of the migrating component still remains substantially constant across the medium 202, even after ion-implantation. Further details relating to the migrating component are included below with reference to FIG. 7C.

Figure 7A:
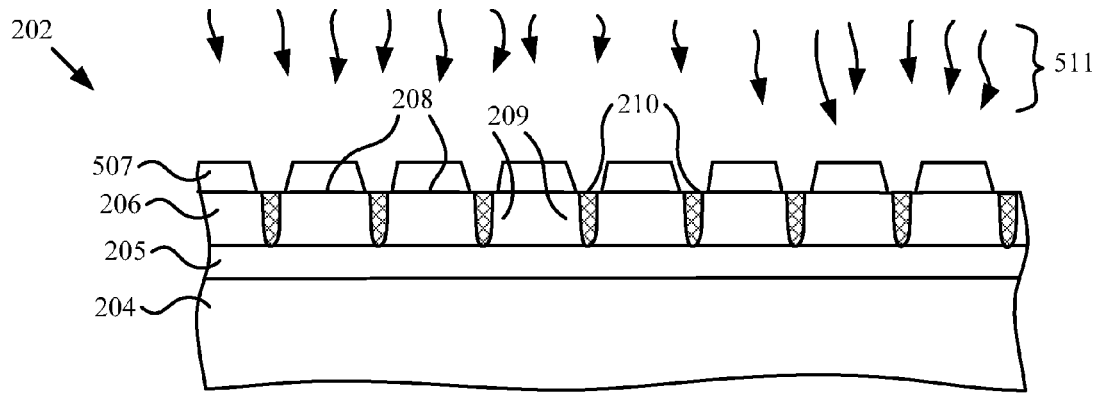
FIG. 7A is a cross-sectional side view of one embodiment of the medium of FIG. 6A after an annealing procedure.

FIG. 7A is a cross-sectional side view of one embodiment of the medium 202 of FIG. 6A after an annealing procedure. The annealing procedure is indicated by arrows 511 representing heat being applied to the medium 202. The temperature required to anneal the medium will depend upon the composition of the magnetic recording layer. For example, magnetic layers containing Co-alloys, such as CoCr and CoCrPt, will tend to require comparatively lower temperatures while magnetic layers containing FePt will tend to require comparatively higher temperatures. In one embodiment, the medium 202 is heated to an annealing temperature between about 250° C. and 800° C. In another embodiment, the medium 202 is heated to an annealing temperature between about 300° C. and 400° C. In one embodiment, the medium 202 is maintained at the annealing temperature for a time period of between about 1 minute and about 120 minutes. In another embodiment, the medium 202 is maintained at the annealing temperature for a time period of between about 5 minutes and about 60 minutes. In yet another embodiment, the medium 202 is maintained at the annealing temperature for a time period of between about 30 minutes and about 60 minutes.

The annealing procedure may take place before stripping the patterned mask layer 207 or, as depicted in FIG. 7A, after stripping the patterned mask layer. Stripping the patterned mask layer may include a vacuum process, such as reactive ion etching. According to another embodiment (not depicted), a protective layer may also be applied over the magnetic layer 206 before the annealing procedure. For example, certain annealing procedures, such as those used when annealing Co-containing or FePt-containing magnetic layers, involve high temperatures and prolonged heating times. As a consequence of the higher temperatures and prolonged heating times, certain magnetic layers 206, if left unprotected, can be subject to oxidation and susceptible to magnetic degradation, according to one embodiment. Accordingly, it is contemplated that in certain implementations a protective layer may be applied over the magnetic layer 206 prior to annealing in order to prevent oxidation and maintain the favorable magnetic properties of the medium 202. It is also contemplated that a secondary protective layer may also be applied over the magnetic layer 206 after the annealing procedure to further shield the magnetic layer 206. In some cases, the patterned mask would be removed, the protective overcoat applied and then the annealing procedure conducted. The patterned mask could be removed by a vacuum etch process, such as by Reactive Ion Etching or sputter etching or ion beam etching. The protective layer could be applied by a vacuum deposition process such as by PECVD or sputtering. The protective layer might contain carbon.

The annealing procedure may also take place under a high vacuum (e.g., 0.00001 millibar) or in an inert gas like helium or argon. It is also contemplated that the annealing may occur in the presence of a reducing atmosphere (e.g., hydrogen). An annealing procedure may include increasing the temperature of a medium at a certain rate to a certain temperature and holding the medium at the certain temperature for a certain time period. For example and according to one embodiment, the medium 202 may be heated at a rate of 5° C. per minute until it reaches 350° C. The medium 202 may then be maintained at 350° C. for 30 minutes in a vacuum before cooling to room temperature. It is contemplated that multiple annealing procedures may be performed on the medium 202. For example, the medium 202 may be heated to a certain temperature and then maintained at the certain temperature for a certain time period in a reducing atmosphere before cooling to room temperature. Continuing the example, the medium 202 may then re-heated to the same or a different temperature for a time period, all while under a vacuum. Thus, the annealing procedure may include heating in various environments, such as in a vacuum or in an inert or forming gas. Also, the heat generated for the annealing procedure may be provided by a lamp or a laser. The annealing, in one embodiment, occurs before any subsequent overcoats or protective layers are applied onto the medium 202.

In the depicted embodiment, the peripheral edge between the island regions 208 and the trench regions 210 is referred to as the boundary region 209. This boundary region, as discussed previously and according to one embodiment, represents the transition region between the substantially amorphous, ion-implanted trench regions 210 and the magnetically favorable island regions 208.

Figure 7B:
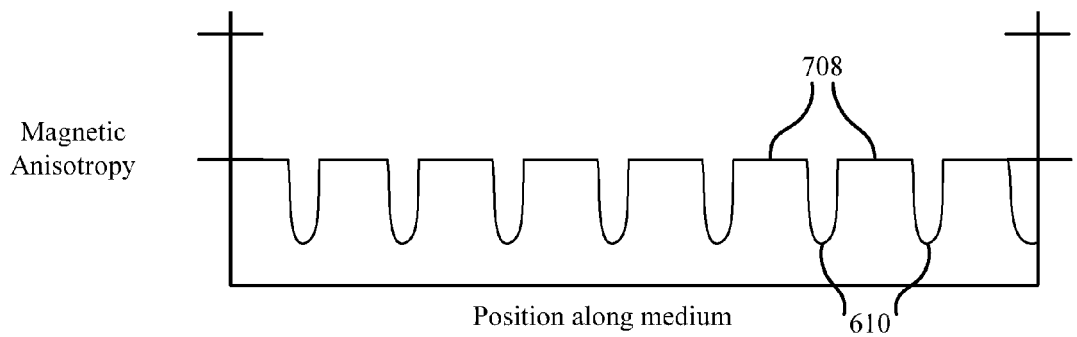
FIG. 7B is a graph showing the approximate relative magnetic anisotropy of the magnetic layer as a function of position along the medium of FIG. 7A.

FIG. 7B is a graph showing the approximate relative magnetic anisotropy of the magnetic layer 206 as a function of position along the medium 202 of FIG. 7A. As shown in the graph, the magnetic anisotropy 708 of the magnetic layer 206 in the island regions 208 after ion implantation and annealing has increased (when compared to the original anisotropy 420 of the magnetic layer 206) while the anisotropy 610 of the impacted trench regions 210 is comparatively lower (when compared to both the new anisotropy 708 of the island regions and the original anisotropy 420 of the magnetic layer 206). The supposed mechanism behind this favorable result is described below with reference to FIG. 7C.

Figure 7C:
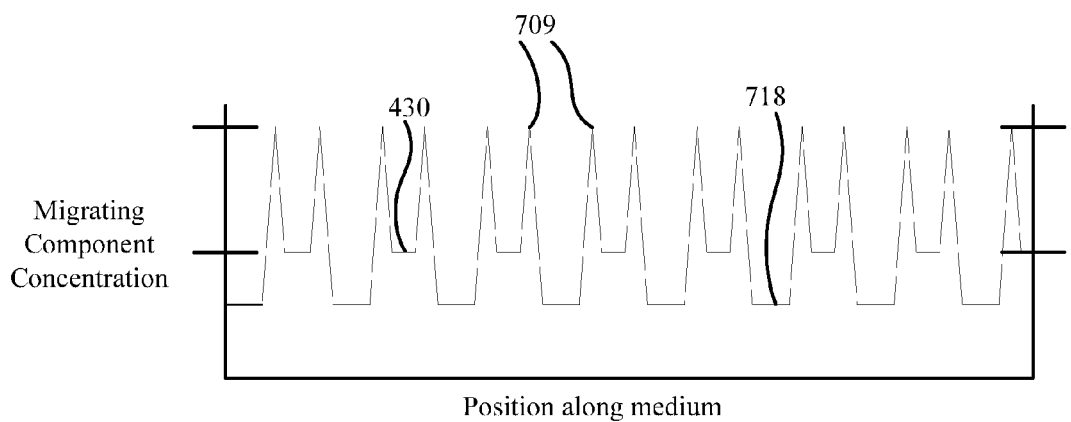
FIG. 7C is a graph showing the approximate relative concentration of a migrating component in the magnetic layer as a function of position along the medium of FIG. 7A, according to one embodiment.

FIG. 7C is a graph showing the approximate relative concentration of the migrating component in the magnetic layer 206 as a function of position along the medium 202 of FIG. 7A, according to one embodiment. The migrating component, in one embodiment, is a constituent of the magnetic layer 206 that is capable and/or susceptible to diffusing from inside the island regions towards the trench regions. For example, in one embodiment where a cobalt-chromium-platinum magnetic alloy comprises the magnetic layer 206, the chromium atoms may migrate from the island regions towards the trench regions under certain temperature conditions. In a similar example, the degree and rate of migration depends on the level of saturation. If chromium is present in the magnetic layer 206 at supersaturated concentrations, it is supposed that the annealing process causes the supersaturated chromium to migrate from inside island regions towards the trench regions.

Therefore, as shown in FIG. 7C, the highest concentration 709 of the migrating component is in the boundary regions 209 between the island regions 208 and the trench regions 210. The lowest concentration 718 of the migrating component is in the island regions 208 because the migrating components are diffusing out of the island regions and towards the trench regions. This migration/diffusion can be due in part to the energetically favorable state that exists in the boundary region 209 as well as because the Cr can diffuse into the amorphous region. Also, the lower free energy state in the boundary region 209 (boundary between amorphous and crystalline morphologies) may comprise a thermodynamically favorable state, relative to the interior of the magnetic BPM bit, for the migrating components. In another embodiment (not depicted), the migrating component may be ions implanted in the boundary region 209 as a result of the ion implantation process. Upon annealing, the ions may diffuse from the island regions towards the trench regions, thereby narrowing the width of the boundary region 209.

Figure 7D:
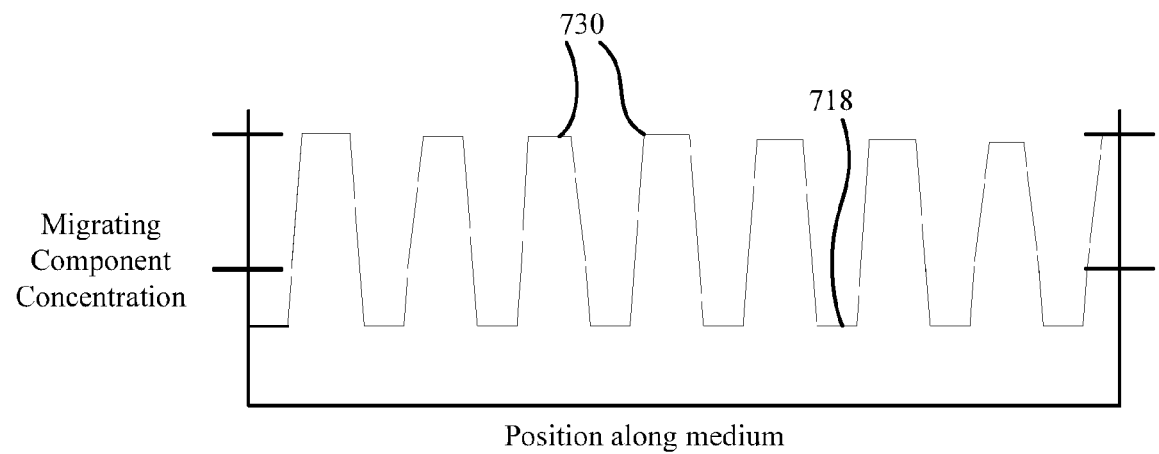
FIG. 7D is a graph showing the approximate relative concentration of a migrating component in the magnetic layer as a function of position along the medium of FIG. 7A, according to another embodiment.

FIG. 7D is a graph showing the approximate relative concentration of the migrating component in the magnetic layer 206 as a function of position along the medium 202 of FIG. 7A, according to one embodiment. The migrating component, in one embodiment, is a constituent of the magnetic layer 206 that is capable and/or susceptible to diffusing from inside the island regions towards the trench regions. For example, in one embodiment where a cobalt-chromium-platinum magnetic alloy comprises the magnetic layer 206, the chromium atoms may migrate from the island regions towards the trench regions under certain temperature conditions. In a similar example, the degree and rate of migration depends on the level of saturation. If chromium is present in the magnetic layer 206 at supersaturated concentrations, it is supposed that the annealing process causes the supersaturated chromium to migrate from inside the island regions towards the trench regions.

Therefore, as shown in FIG. 7D, the highest concentration 730 of the migrating component is in the trench regions. The lowest concentration 718 of the migrating component is in the island regions 208 because the migrating components are diffusing out of the island regions and towards the trench regions. This migration/diffusion can be due in part to the energetically favorable state that exists in the boundary region 209 as well as because the Cr can diffuse into the amorphous region. Also, the lower free energy state in the boundary region 209 (boundary between amorphous and crystalline morphologies) may comprise a thermodynamically favorable state, relative to the interior of the magnetic BPM bit, for the migrating components. In another embodiment (not depicted), the migrating component may be ions implanted in the boundary region 209 as a result of the ion implantation process. Upon annealing, the ions may diffuse from island regions towards trench regions, thereby narrowing the width of the boundary region 209. It is contemplated that the concentration of the migrating component across the length of the medium 202 may vary according to the specifics of a given implementation. Accordingly, the embodiments depicted in FIGS. 7C and 7D are merely examples of the relative concentrations of the migrating component and are not intended to limit the scope of the present disclosure.

Figure 8:
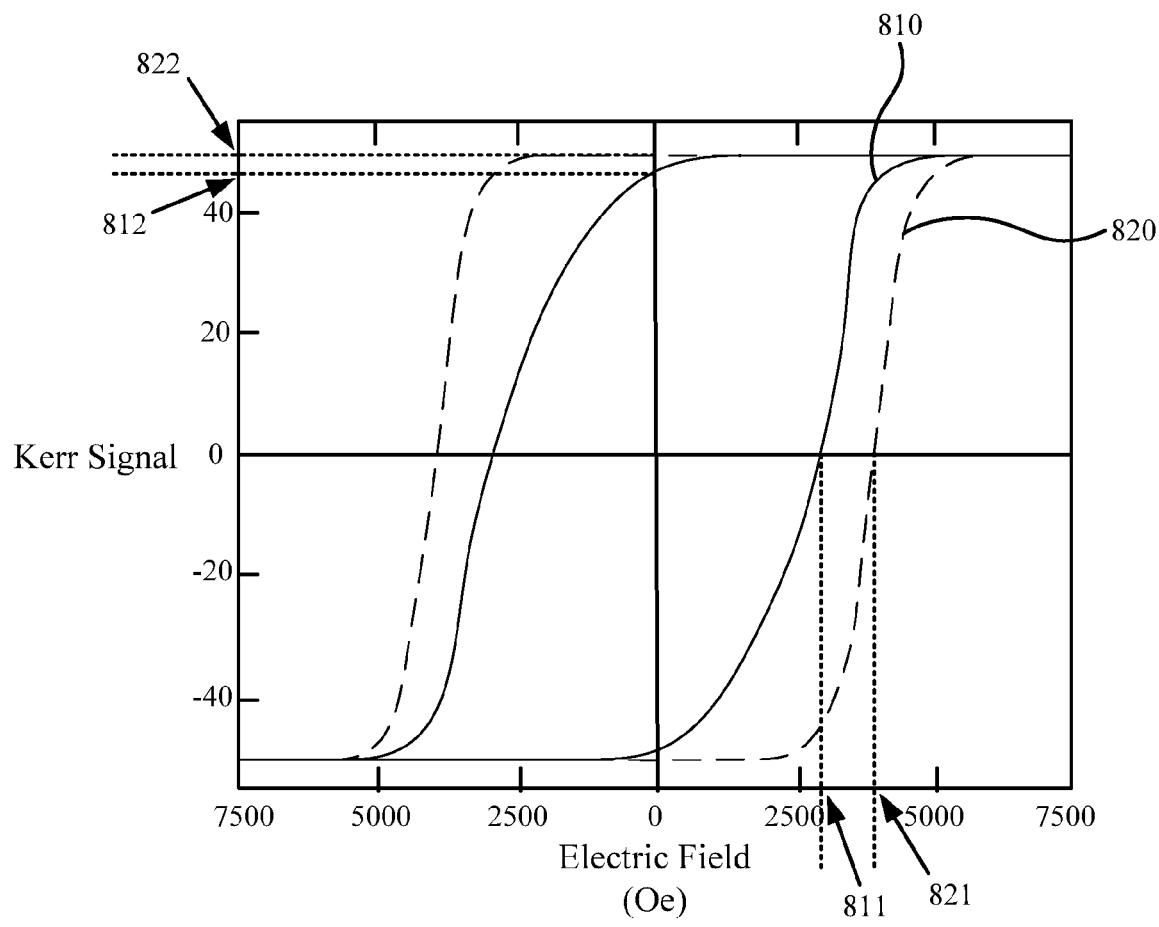
FIG. 8 is a graph showing major hysteresis loops for a pre-annealed medium and a post-annealed medium, according to one embodiment.

FIG. 8 is a graph showing major hysteresis loops for a pre-annealed medium 810 (e.g., shown in solid lines) and a post-annealed medium 820 (e.g., shown in dashed lines), according to one embodiment. As shown in the graph, the pre-annealed medium 810 has a coercivity 811 of about 3,000 Oe and the post-annealed medium 820 has a coercivity 821 of about 4,000 Oe. Also as seen in the graph, the pre-annealed medium 810 has a remanent magnetization that registered a Kerr signal 812 of about 43 and the post-annealed medium 811 has a remanent magnetization that registered a Kerr signal 822 of about 47. Therefore, the annealed medium 820 has a comparatively higher coercivity 821 and a comparatively higher remanent magnetization 822 rating. The higher coercivity 821 is important for maintaining stable magnetization and the higher remanent magnetization 822 rating is important for maintaining a sufficient read-back signal per island.

Figure 9:
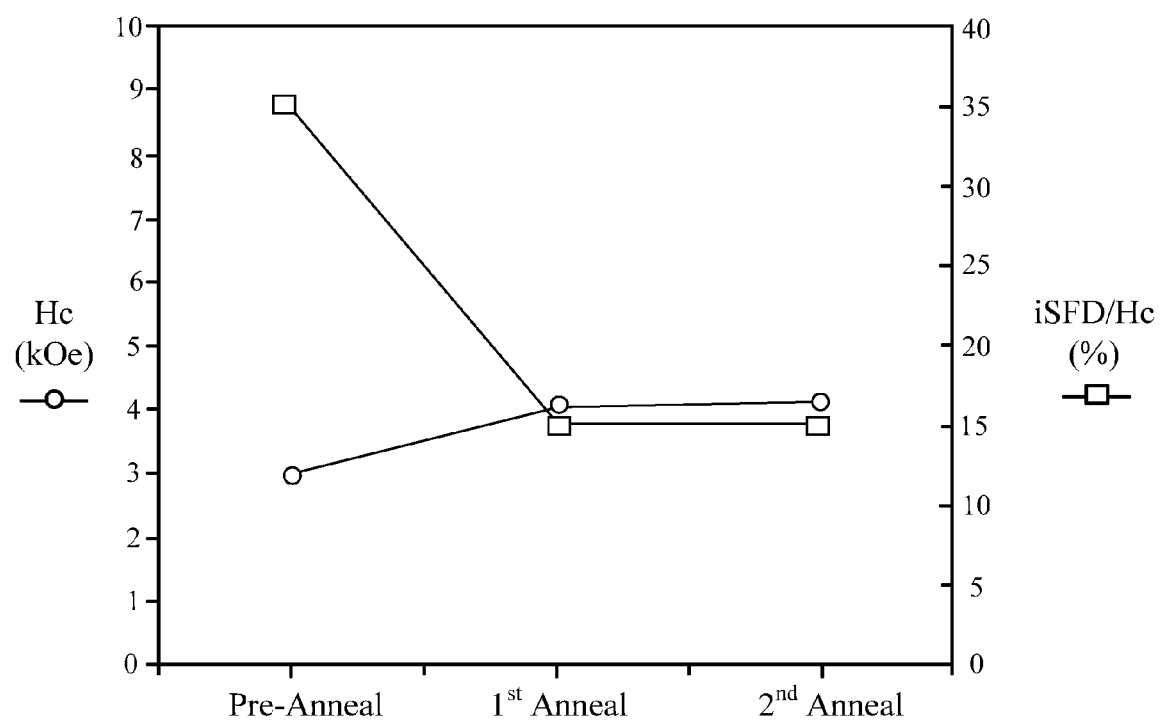
FIG. 9 is a graph showing the magnetic coercivity and the ratio of intrinsic switching field distribution over magnetic coercivity of a medium as a function of annealing status, according to one embodiment.

FIG. 9 is a graph showing the magnetic coercivity and the ratio of intrinsic switching field distribution over magnetic coercivity of a medium as a function of annealing status, according to one embodiment. In the depicted graph, a medium at three different stages of fabrication is analyzed. The first stage is pre-anneal, the second stage is after the first anneal, and the third stage is after the second anneal. The left axis is the coercivity of the medium (similar to coercivity numbers described above with reference to FIG. 8) and is shown with circles at each stage of fabrication. The right axis is the ratio of the intrinsic switching field distribution over the coercivity and such a ratio is shown as a percentage with boxes at each stage of fabrication.

The pre-annealed medium has an original coercivity of about 3,000 Oe. After the first anneal, the medium has an increased coercivity of about 4,000 Oe. After the second anneal, the medium has a marginally increased coercivity of just over 4,000 Oe. The ratio of the intrinsic switching field distribution over the coercivity is an important and valuable metric for analyzing an anneal procedure. In order to lower the ratio (desirable), either the numerator has to decrease (decreased switching field distribution) or the denominator has to increase (increased coercivity). Therefore, in the graph shown in FIG. 9, the ratio's substantial drop from about 35% to about 15% after a single annealing procedure. This drop, according to one embodiment, is due to the decreased switching field distribution (from 1060 Oe to 615 Oe) and to the increased coercivity (from about 3,000 Oe to about 4,000 Oe).

Figure 10:
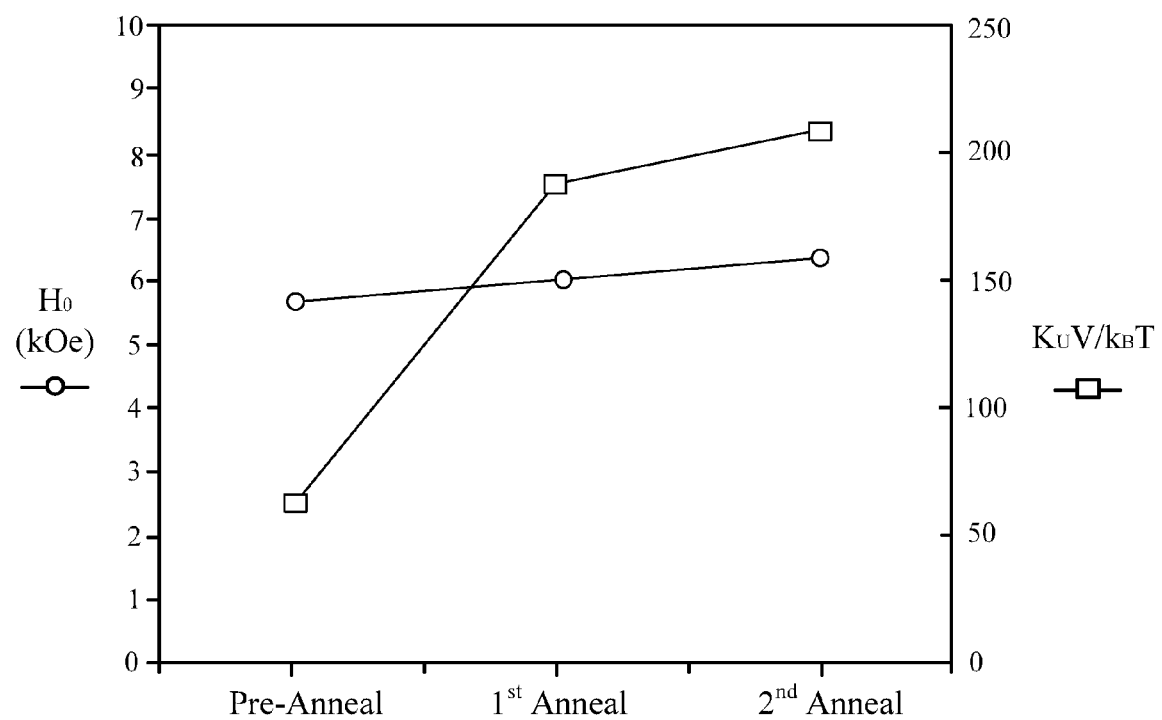
FIG. 10 is a graph showing the remanent magnetization and the thermal stability of a medium as a function of annealing status, according to one embodiment.

FIG. 10 is a graph showing the remanent magnetization and the thermal stability of a medium as a function of annealing status, according to one embodiment. The annealing has been found to also significantly increase the thermal stability ($K_u V$) of the individual islands. In one example, $K_u V/k_B T$ was increased from about 85 to about 206 after two annealing procedures. Thus the annealing significantly improves the thermal stability of the small data islands Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method for improving magnetic stability of an ion-implanted bit-patterned medium, the method comprising:
   providing a medium, the medium comprising a magnetic layer and a substrate, wherein the magnetic layer comprises migrating components;
   forming a patterned mask layer on the surface of the magnetic layer;
   ion-implanting the medium through the patterned mask layer, wherein the exposed portions of the magnetic layer comprise trench regions, the covered portions of the magnetic layer comprise island regions, and the transition areas between the trench regions and the island regions comprise boundary regions, wherein the island regions have more favorable magnetic properties than the trench regions;
   removing the patterned mask layer from the surface of the magnetic layer;
   after removing the patterned mask layer from the surface of the magnetic layer, applying a protective layer over the surface of the magnetic layer; and
   after ion-implanting the medium and applying the protective layer over the magnetic layer, increasing a remanent magnetization rating of the magnetic layer by annealing the medium;
   wherein, upon annealing, the migrating components diffuse from inside the island regions towards the trench regions resulting in the trench regions having a comparatively higher concentration of migrating components than the island regions.

2. The method of claim 1 wherein the magnetic layer is supersaturated with chromium atoms, and wherein the migrating components comprise the chromium atoms.

3. The method of claim 1, wherein ions implanted in the boundary regions during ion implantation comprise migrating components which, upon annealing, diffuse from the boundary regions towards the trench regions.

4. The method of claim 1, wherein ions used for ion-implanting are selected from the group consisting of: boron, carbon, phosphorus, arsenic, antimony, selenium, sulfur, chromium, silicon, germanium, nitrogen, and metalloid type elements.

5. The method of claim 1, wherein annealing comprises heating the medium in a vacuum.

6. The method of claim 1, wherein annealing comprises heating the medium in the presence of an inert gas.

7. The method of claim 1, wherein annealing comprises heating the medium with a laser or a lamp.

8. The method of claim 1, wherein annealing the medium comprises heating the medium to a temperature between about 250° C. and about 800° C.

9. The method of claim 1, wherein annealing the medium comprises heating the medium to a temperature between about 300° C. and about 400° C.

10. The method of claim 1, wherein annealing the medium comprises heating the medium to a temperature for a period of time between about 1 minute and about 120 minutes.

11. The method of claim 1, wherein annealing the medium comprises heating the medium to a temperature for a period of time between about 5 minutes and about 60 minutes.

12. The method of claim 1, wherein annealing the medium comprises heating the medium to a temperature for a period of time between about 30 minutes and about 60 minutes.

13. The method of claim 1, wherein annealing the medium comprises heating the medium to a temperature for a period of time between about 1 microsecond and about 5 minutes.

14. The method of claim 1, wherein annealing the medium comprises multiple heating procedures.

15. A method for improving magnetic stability of an ion-implanted bit-patterned medium, the method comprising:
   providing a medium, the medium comprising a magnetic layer and a substrate, wherein the magnetic layer is supersaturated with chromium atoms:
   forming a patterned mask layer on the surface of the magnetic layer;
   ion-implanting the medium through the patterned mask layer, wherein the exposed portions of the magnetic layer comprise trench regions, the covered portions of the magnetic layer comprise island regions, and the transition areas between the trench regions and the island regions comprise boundary regions, wherein the island regions have more favorable magnetic properties than the trench regions; and
   after ion-implanting the medium through the patterned mask layer, diffusing the chromium atoms of the magnetic layer from the island regions towards the trench regions and increasing a remanent magnetization rating of the magnetic layer by annealing the medium;
   wherein, after annealing, the trench regions have a comparatively higher concentration of chromium atoms than the island regions.

* * * * *